(12) United States Patent
Tashiro

(10) Patent No.: US 10,133,815 B2
(45) Date of Patent: Nov. 20, 2018

(54) DOCUMENT ASSOCIATION DEVICE, DOCUMENT ASSOCIATION SYSTEM, AND PROGRAM

(71) Applicant: KONICA MINOLTA, INC., Chiyoda-ku, Tokyo (JP)

(72) Inventor: Koichi Tashiro, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 22 days.

(21) Appl. No.: 15/225,454

(22) Filed: Aug. 1, 2016

(65) Prior Publication Data

US 2017/0039171 A1   Feb. 9, 2017

(30) Foreign Application Priority Data

Apr. 8, 2015 (JP) ................ 2015-1513775

(51) Int. Cl.
| | |
|---|---|
| *G06F 17/00* | (2006.01) |
| *G06F 17/30* | (2006.01) |
| *G06F 17/22* | (2006.01) |
| *G06F 17/27* | (2006.01) |

(Continued)

(52) U.S. Cl.
CPC .... *G06F 17/30722* (2013.01); *G06F 17/2235* (2013.01); *G06F 17/2765* (2013.01); *G06F 17/30011* (2013.01); *G06F 17/30014* (2013.01); *G06Q 10/10* (2013.01); *G06Q 30/02* (2013.01)

(58) Field of Classification Search
CPC ............... G06F 17/30047; G06F 17/30864
See application file for complete search history.

(56) References Cited

U.S. PATENT DOCUMENTS

| | | | | |
|---|---|---|---|---|
| 5,970,505 A | * | 10/1999 | Ebrahim | ........... G06F 17/30014 707/999.104 |
| 6,356,922 B1 | | 3/2002 | Schilit et al. | |

(Continued)

FOREIGN PATENT DOCUMENTS

| | | |
|---|---|---|
| JP | 2000010981 A | 1/2000 |
| JP | 2000035969 A | 2/2000 |
| JP | 2006146310 A | 6/2006 |

(Continued)

OTHER PUBLICATIONS

Japanese Office Action (and English translation thereof) dated Oct. 31, 2017, issued in counterpart Japanese Application No. 2015-153775.

*Primary Examiner* — Quoc A Tran
(74) *Attorney, Agent, or Firm* — Holtz, Holtz & Volek PC

(57) ABSTRACT

A document association device includes: a document designating unit configured, to receive designation of a first document and a second document to be referred to from the first document; a dividing unit configured to divide the second document into a plurality of portions; a relevant portion identifying unit configured to compare contents of the respective portions of the divided second document with contents of a predetermined portion of the first document, and identify the portion having the highest degree of association with the predetermined portion among the plurality of portions as a relevant portion; and an associating unit configured to associate the relevant portion of the second document with the predetermined portion of the first document, to enable calling up of the relevant portion from the predetermined portion.

8 Claims, 19 Drawing Sheets

(51) Int. Cl.
 *G06Q 10/10* (2012.01)
 *G06Q 30/02* (2012.01)

(56) References Cited

U.S. PATENT DOCUMENTS

2007/0150456 A1* 6/2007 Lian ................. G06F 17/30722
2009/0276693 A1* 11/2009 Miyamoto ........... G06F 17/212
                                                              715/234

FOREIGN PATENT DOCUMENTS

| JP | 2006202018 A | 8/2006 |
| JP | 2008299566 A | 12/2008 |
| JP | 2009020639 A | 1/2009 |
| JP | 2012053655 A | 3/2012 |
| JP | 2013020437 A | 1/2013 |
| JP | 2014186644 A | 10/2014 |

* cited by examiner

FIG. 10

| BODY | COMMENTS FIELD |

[DOCUMENT A]
CHAPTER 1: ····

CHAPTER 2: ····

(For more detail,
see document B.)

COMMENT 1

DOCUMENT B

CHAPTER 5: ····

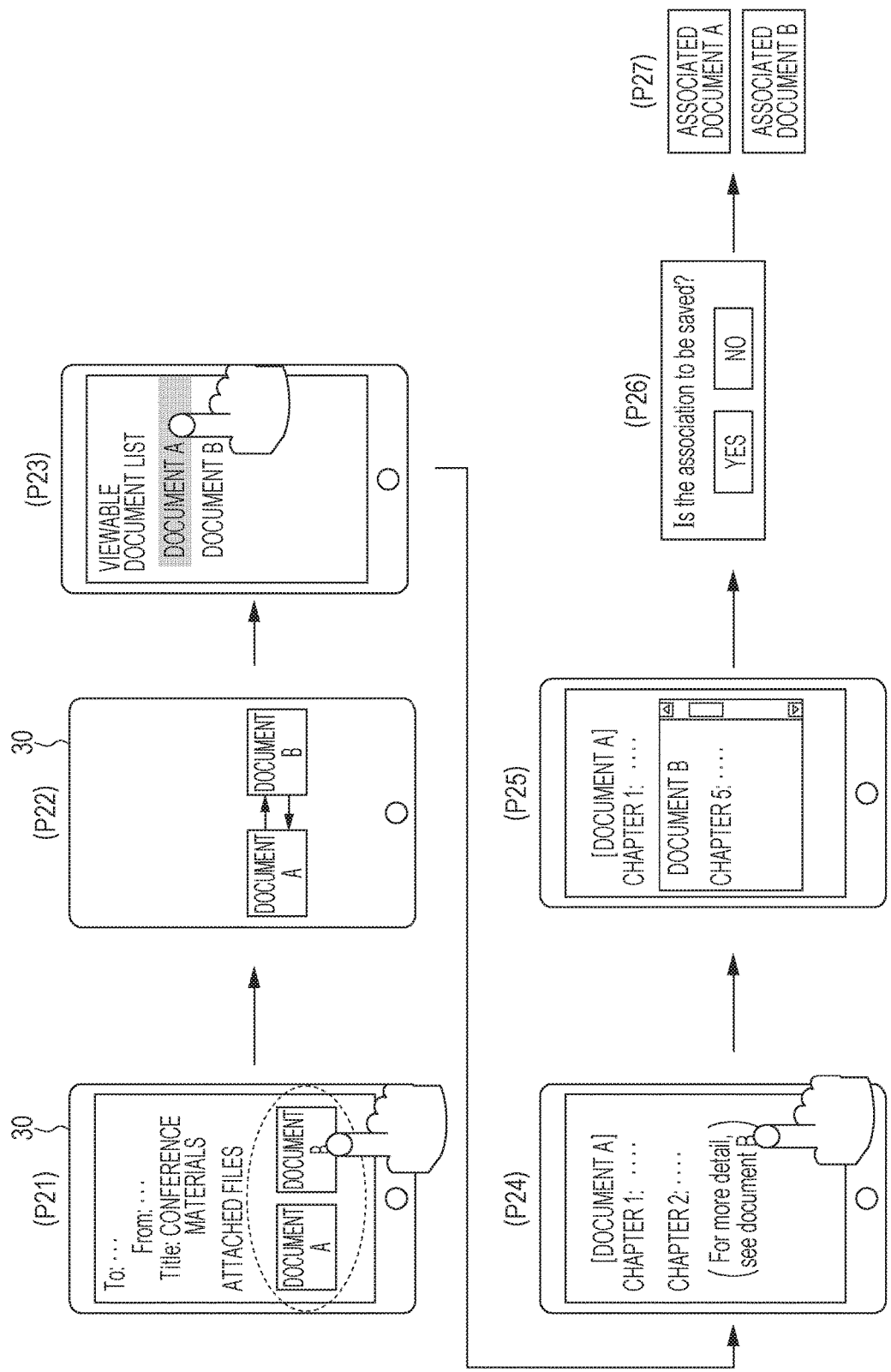

DOCUMENT ASSOCIATION DEVICE, DOCUMENT ASSOCIATION SYSTEM, AND PROGRAM

The entire disclosure of Japanese Patent Application No. 2015-153775 filed on Aug. 4, 2015 including description, claims, drawings, and abstract are incorporated herein by reference in its entirety.

BACKGROUND OF THE INVENTION

Field of the Invention

The present invention relates to a document association device that associates documents with each other, a document association system, and a program.

Description of the Related Art

Mobile devices such as smartphones and tablet PCs have rapidly spread in recent years, and electronic documents are often viewed on these mobile devices. For example, information materials are often viewed on mobile devices during conferences. In some conferences, a main document main text) and auxiliary information materials are provided as conference materials, and the participants are sometimes requested to refer to the auxiliary information materials while reading the main text.

For example, in a case where a request for reference to a document B as another document (such as "for more detail, see document. B") is issued while a user is viewing a document A, as shown in FIG. 19, a user opens the document B after closing the document A that has been open (FIG. 19B), or opens the document A and the document B at the same time (FIG. 19C). The user detects the relevant portion from the document B, and refers to the portion. After referring to the document B, the user closes the document B, and returns to viewing of the document A.

Since most mobile devices have small-sized displays, it is necessary for a user to often perform a scrolling operation or rescale characters when searching the document B for a portion to be referred to. As a result, the operation becomes complicated. Further, the portions to be referred to in the document B are not clearly specified in many cases. In such a case, searching the document B for a relevant portion is even more troublesome.

JP 2013-020437 A discloses an example of a technique for facilitating reference to another document from one document. In a case where each document has chapter numbers, and documents associated with one another are to be created, at least one document should be created, so that the format for the other documents is created in accordance with the already created document, and association information serving as information about links among the documents can be automatically generated.

Further, there is a technique for aiding an operation to manually create link information for associating a specific portion in a link destination document file with a specific portion in a link source document file (see JP 2000-035969 A), and there is a technique for generating links in accordance with operation information or the like received at the time of document viewing (see JP 2014-186644). Further, there is a technique for determining a document having a high degree of association with one document in accordance with document names and information about authors (see JP 2009-020639 A).

In a case where a document includes a request for reference to another document, and the document to be referred to is simply designated, a viewer needs to take a lot of trouble to search the document for the relevant portion. Therefore, it is preferable to further designate the portion to be referred to in the document. To simplify the operation to open the document to be referred to, the link information for calling up the relevant portion of the document to be referred to is preferably buried in the reference source document.

However, in a case where the author of a document has not buried such link information in the document, a viewer of the document needs to take a lot of trouble to search for the relevant portion and display the relevant portion, as described above.

The technique disclosed in JP 2013-020437 A is effective in creating a document. However, any link cannot be put to a relevant portion after a document is created. By the technique disclosed in JP 2000-035969 A, creating the link information is easier, but the link information is manually created. Therefore, creating the link information is still troublesome. The technique disclosed in JP 2014-186644 A is incapable of coping with first-time viewing of a target document By the technique disclosed in WP 2009-020639 A, a relevant document can be detected, but it is not possible to determine which portion in the document has the highest degree of association.

SUMMARY OF THE INVENTION

The present invention has been made to solve the above problems, and an object thereof is to provide a document association device that automatically detects a portion relevant to a predetermined portion of one document from another document, and associates the relevant portion with the predetermined portion so that the relevant portion can be called up from the predetermined portion of the one document and be displayed, a document association system, and a program.

The summary of the present invention for achieving the above object lies in the following aspects of the invention.

[1] To achieve the abovementioned object, according to an aspect, a document association device reflecting one aspect of the present invention comprises:

a document designating unit configured to receive designation of a first document and a second document to be referred to from the first document;

a dividing unit configured to divide the second document into a plurality of portions;

a relevant portion identifying unit configured to compare contents of the respective portions of the divided second document with contents of a predetermined portion of the first document, and identify the portion having the highest degree of association with the predetermined portion among the plurality of portions as a relevant portion; and an associating unit configured to associate the relevant portion of the second document with the predetermined portion of the first document, to enable calling up of the relevant portion from the predetermined portion.

In the above embodiment, the document association device detects a portion (the relevant portion) having a high degree of association with a predetermined portion of the first document from the second document, and associates the relevant portion of the second document with the predetermined portion of the first document so that the relevant portion of the second document can be called up from the predetermined portion of the first document. For example, information about a link to the relevant portion of the second document is buried in the predetermined portion of the first document.

[2] According to the document association device of Item. 1, the document association device preferably further comprises a reference source extracting unit configured to search the first document for a predetermined keyword indicating reference to the second document, and extract a portion including the predetermined keyword from the first document, the portion including the predetermined keyword being the predetermined portion.

In the above embodiment, if the first document includes a keyword such as "see document B", this portion is extracted as a reference source of another document.

[3] According to the document association device of Item. 1 or 2, the document association device preferably further comprises a saving unit configured to save a document having association information buried in the first document, the association information being designed for enabling calling up of the relevant portion from the predetermined portion.

In the above embodiment, the document having the association information buried therein is saved, so that the document can be reused in later viewing.

[4] According to the document association device of Item. 3, the document association device preferably further comprises a save confirming unit configured to present a user with the relevant portion to be associated with the predetermined portion of the first document, and receive a selective response indicating whether to save the document having the association information buried in the first document, wherein, when the save confirming unit receives a selective response indicating that the document is to be saved, the saving unit saves the document having the association information buried in the first document.

In the above embodiment, the relevant portion is presented to the user before the document having the association information buried therein is saved. Thus, the user can determine whether to save the document having the association information buried therein, after confirming validity of the automatically detected relevant portion.

[5] According to the document association device of Item. 3 or 4, the saving unit preferably buries link information in the predetermined portion of the first document, the link information being designed for calling up the relevant portion of the second document.

In the above embodiment, link information is buried as the association information.

[6] According to the document association device of Item. 3 or 4, the saving unit preferably extracts the relevant portion from the second document, and buries the extracted relevant portion in the first document, to enable calling up and display of the relevant portion from the predetermined portion of the first document, without affecting original contents of the first document.

In the above embodiment, the contents of the relevant portion are buried in the first document, so as not to affect the original contents of the first document. That is, the contents of the relevant portion are buried in a portion other than the body text of the first document. For example, the contents of the relevant portion are buried in a comments field or a remarks column.

[7] According to the document association device of any one of Items. 3 to 6, the saving unit preferably receives designation of a saving location of the document having the association information buried in the first document from a user, and saves the document including the buried association information in the designated saving location.

In the above embodiment, the user can choose the location in which the document having the association information buried therein is to be saved.

[8] According to the document association device of any one of Items. 1 to 7, the dividing unit preferably performs the division in accordance with tag information defining a document structure.

In the above embodiment, a document in the XML (eXtensible Markup Language) format is divided after the structure of the document is checked in accordance with tag information indicating chapters and paragraphs, for example.

[9] To achieve the abovementioned object, according to an aspect, a document viewer system reflecting one aspect of the present invention comprises:

the document association device of any one of Items. 1 to 8; and a viewer device configured to allow a user to view a document, the viewer device including a display unit, wherein, when receiving a predetermined operation on the predetermined portion while the first document associated by the associating unit is being viewed, the viewer device calls up and displays the relevant portion.

[10] To achieve the abovementioned object, according to an aspect, a non-transitory recording medium storing a computer readable program implemented in an information processing terminal, reflecting one aspect of the present invention comprises:

a document designating step of receiving designation of a first document and a second document to be referred to from the first document;

a dividing step of dividing the second document into a plurality of portions;

a relevant portion identifying step of comparing contents of the respective portions of the divided second document with contents of a predetermined portion of the first document, and identifying the portion having the highest degree of association with the predetermined portion among the plurality of portions as a relevant portion;

an associating step of associating the relevant portion of the second document with the predetermined portion of the first document, to enable calling up of the relevant portion from the predetermined portion;

a step of displaying the associated first document; and a step of calling up and displaying the relevant portion when a predetermined operation on the predetermined portion is received while the first document is displayed.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 10 is a diagram showing an example case where a relevant portion in a document B is buried in a comments field in a document A;

FIG. 18 is a diagram showing a specific example of a series of procedures for associating, viewing, and saving documents in a document viewer device according to a third embodiment.

DESCRIPTION OF THE PREFERRED EMBODIMENTS

Hereinafter, various embodiments of the present invention will be described with reference to the drawings. However, the scope of the invention is not limited to the illustrated examples.

Figure 1:
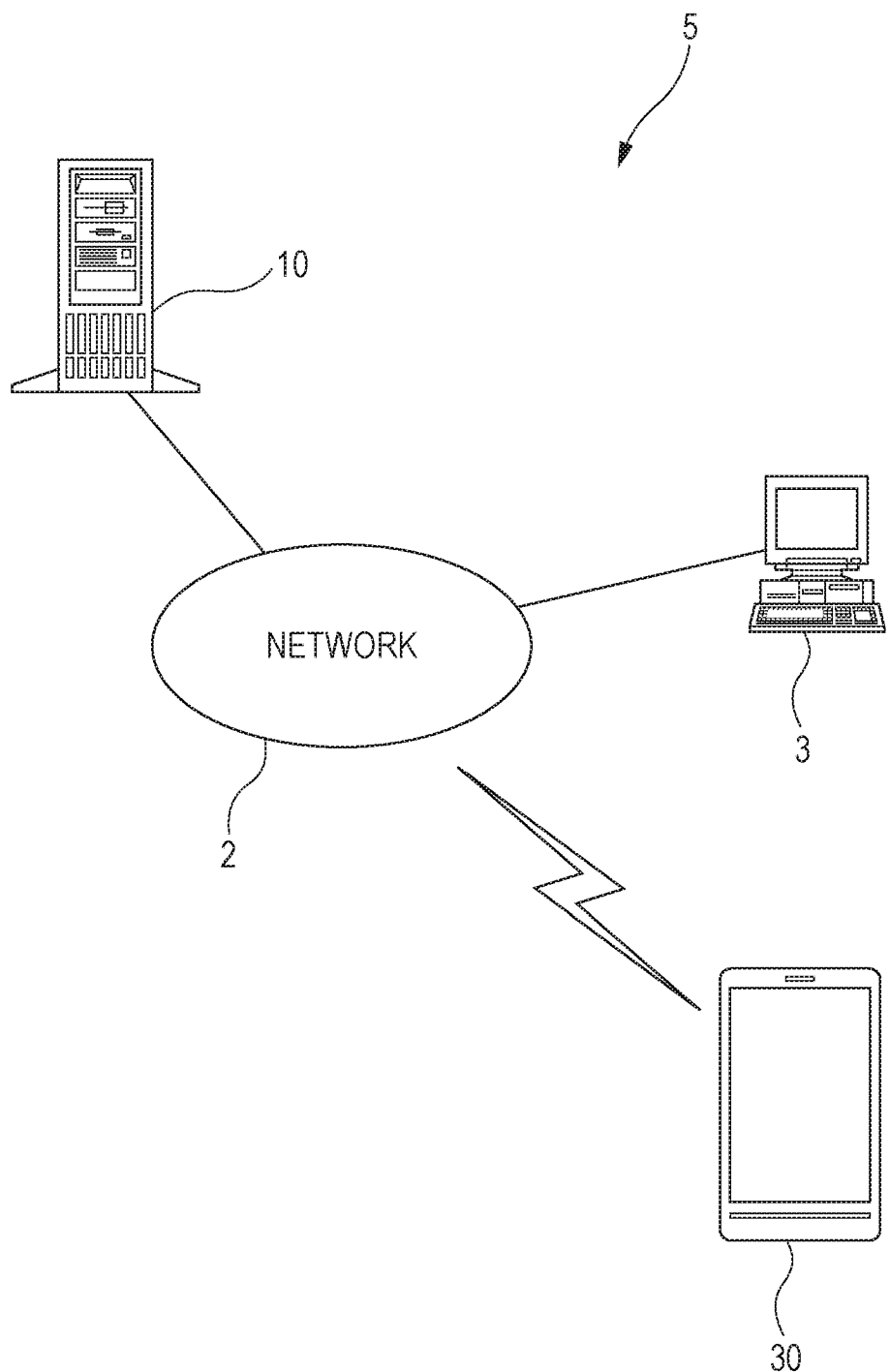
FIG. 1 is a diagram showing an example structure of a document viewer system 5 according to first and second embodiments of the present invention.

FIG. 1 shows an example structure of a document viewer system 5 according to a first embodiment of the present invention. The document viewer system 5 includes a document association device 10 and a document viewer device 30 that can be connected to the document association device 10 via a network 2. The document viewer device 30 is a portable information processing terminal, such as a smartphone or a tablet. The document association device 10 is a server that provides a document association function. A personal computer (PC) 3 and the like are also connected to the network 2.

In the document viewer system 5, an e-mail message that is a notice of a conference and has a document A and a document B attached thereto is transmitted from the PC 3 to the document viewer device 30, for example. The document A and the document B are conference materials. The user of the document viewer device 30 designates the document A and the document B attached to the received e-mail message, and requests the document association device 10 to perform an association process on these documents. The document viewer device 30 that has received the request searches the document A for a keyword (a reference request) indicating reference to another document, such as "see document B", and extracts a portion including the reference request as a reference source portion from the document A.

The document B is then searched for the portion having the highest degree of association with the reference source portion (the chapter having the highest degree of association with the reference source portion in the case of a chaptered document, for example), and the portion is determined to be a relevant portion. The relevant portion is associated with the portion of the reference request in the document A so that the relevant portion can be called up from the portion of the reference request. In this case, association information for calling up the relevant portion is buried in the portion of the reference request. The association information is information about the link to the relevant portion, or the relevant portion is buried as the association information in the document A so as not to affect the original contents of the document A. For example, the contents of the relevant portion are buried in a portion other than the body text, such as a comments field or a remarks column.

When the already associated document A is being viewed, and the association information that is for calling up the relevant portion in the document B and is buried in the document A is selected, the document viewer device 30 calls up the relevant portion in the document B, and displays the relevant portion.

As described above, in the document viewer system 5, one document is searched for a reference request, a portion relevant to the portion of the reference request is automatically found out from a reference destination document, and the relevant portion is associated with the portion of the reference request in the one document so that the relevant portion can be called up from the portion of the reference request. Thus, even in a document that does not have information about any link to a reference destination, an appropriate reference destination can be readily called up from a reference source.

Figure 2:
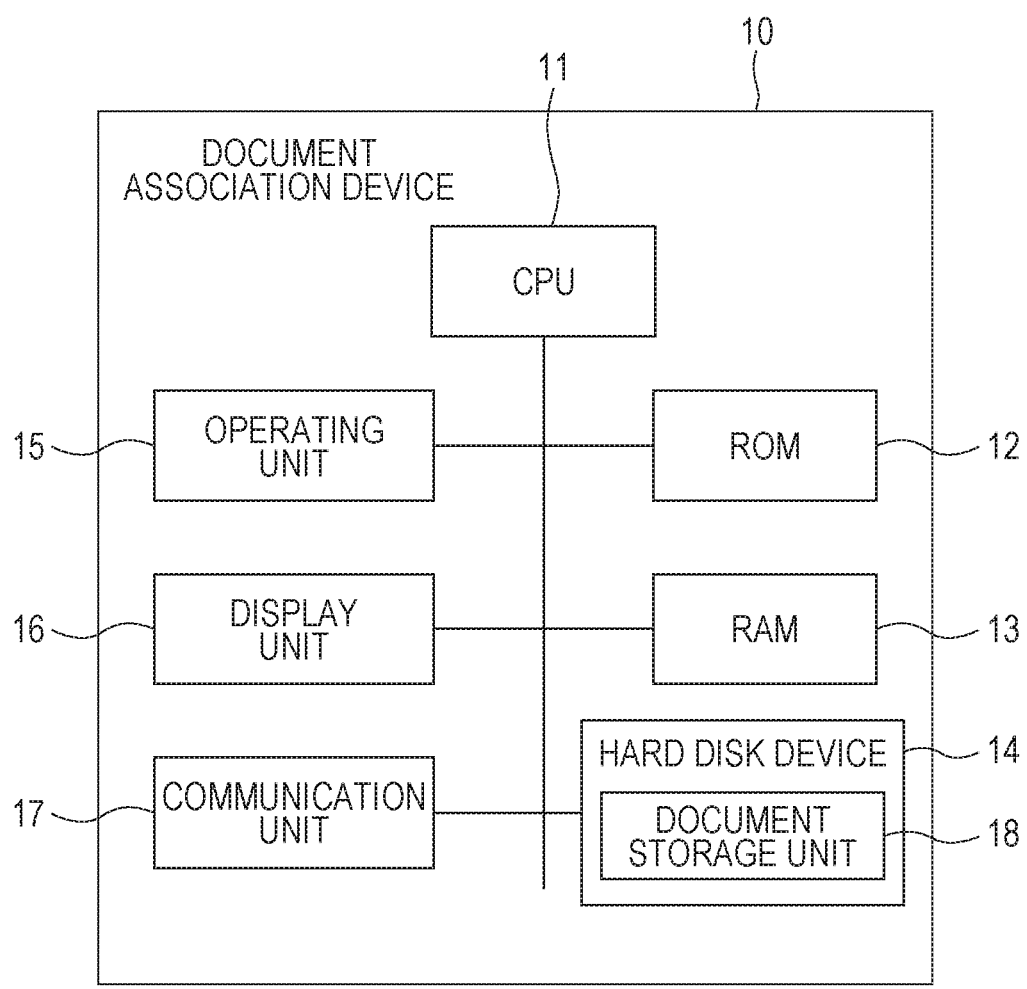
FIG. 2 is a block diagram schematically showing the structure of a document association device.

FIG. 2 is a block diagram schematically showing the structure of the document association device 10. In the document association device 10, a read only memory (ROM) 12, a random access memory (RAM) 13, a hard disk device 14, an operating unit 15, a display unit 16, a communication unit 17, and the like are connected, via a bus, to a central processing unit (CPU) 11 that collectively controls operation of the document association device 10.

The CPU 11 operates on the basis of an operating system (OS) program, and executes programs, such as middleware and application programs. The ROM 12 is a read only memory in which the activation program and various fixed data are stored.

The hard disk device 14 is a large-capacity nonvolatile storage device. The OS program, the program for a document association process, and the like are stored in the hard disk device 14. As the CPU 11 executes the program for a document association process, the function of the document association device 10 is achieved. The hard disk device 14 further functions as a document storage unit 18 that stores documents to be associated and already associated documents.

The RAM 13 is a memory that is used as a work area or the like in which various kinds of data are temporarily stored when the CPU 11 executes a program.

The display unit 16 is formed with a liquid crystal display that displays various kinds of information. The operating unit 15 functions to receive various operations and inputs from the user. The operating unit 15 is formed with a keyboard, a mouse, a touch panel provided on the display screen of the display unit 16, or the like.

The communication unit 17 functions to communicate with the PC 3, the document viewer device 30, and other external devices through the network 2.

Figure 3:
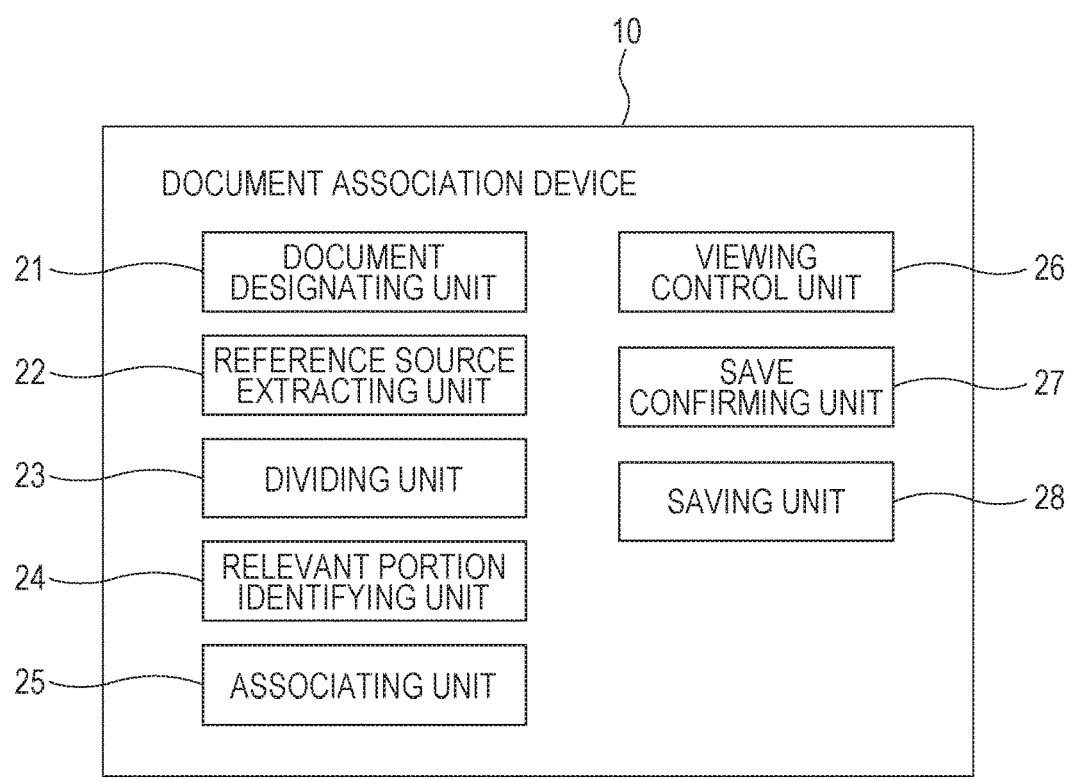
FIG. 3 is a diagram showing the functional structure related to the document association process to be performed by the document association device.

FIG. 3 shows the functional structure related to the document association process to be performed by the document association device 10. The document association device 10 is formed with a CPU or the like that functions as a document designating unit 21, a reference source extracting unit 22, a dividing unit 23, a relevant portion identifying unit 24, an associating unit 25, a viewing control wait 26, a save confirming unit 27, and a saving unit 28.

The document designating unit 21 receives designation of a first document and a second document to be referred to from the first document. The reference source extracting unit 22 searches the first document for a predetermined keyword indicating reference to the second document, and extracts a portion including the predetermined keyword as the reference source portion from the first document The dividing unit 23 divides the second document into portions.

The relevant portion identifying unit 24 compares the contents of the reference source portion in the first document with the contents of each of the divided portions of the second document, and identifies the relevant portion that is the portion having the highest degree of association with the reference source portion among the divided portions. The associating unit 25 associates the relevant portion in the second document with the reference source portion in the first document so that the relevant portion can be called up from the reference source portion (or buries the association information in the first document).

The viewing control unit 26 controls viewing of a document. The save confirming unit 27 presents the user with the relevant portion to be associated with the reference source portion in the first document, and receives a selective response indicating whether a document having the association information buried in the first document is to be saved. When the save confirming unit 27 receives a selective response indicating that the document having the association information buried in the first document is to be saved, the saving unit 28 saves the document having the association information buried in the first document (this document will be referred to as the associated document).

Figure 4:
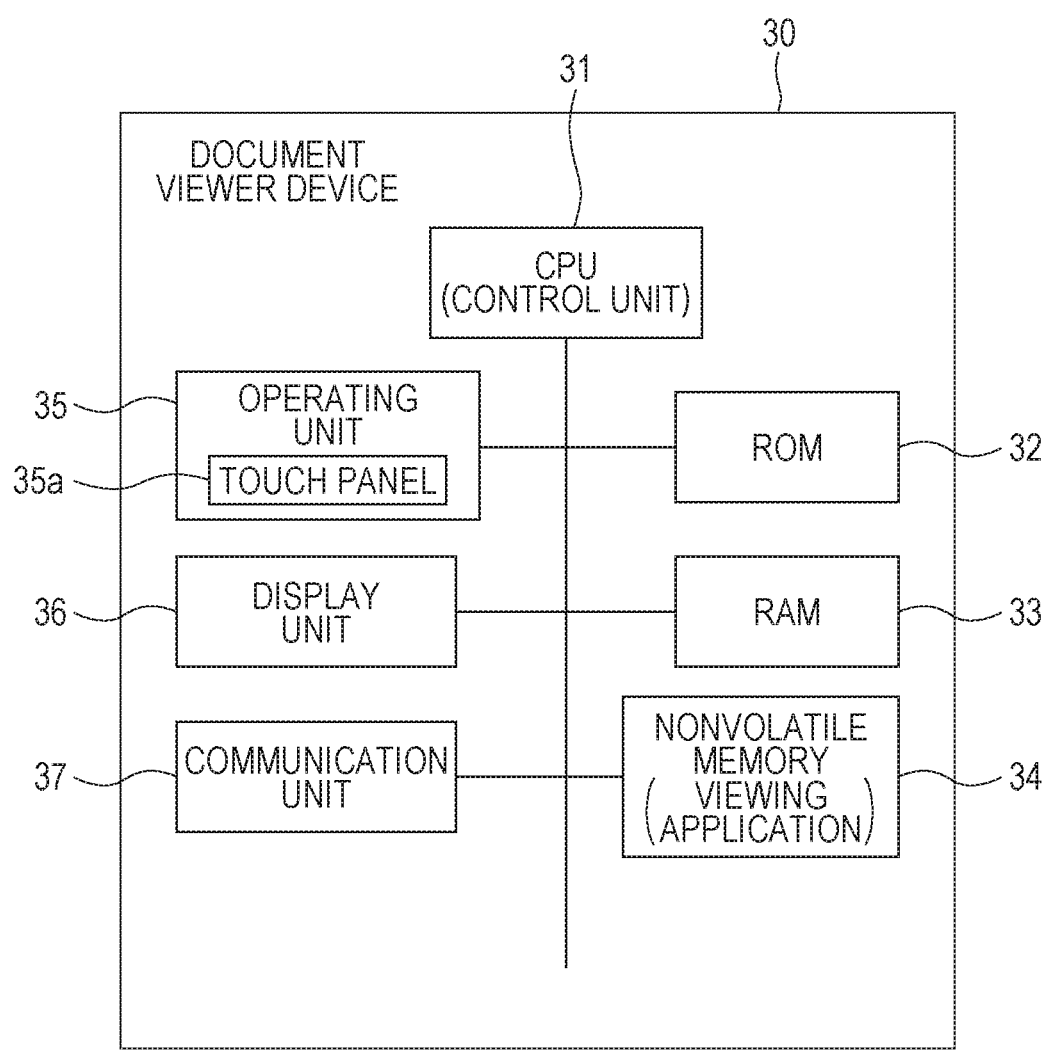
FIG. 4 is a block diagram schematically showing the structure of a document viewer device.

FIG. 4 is a block diagram schematically showing the structure of the document viewer device 30. In the document viewer device 30, a ROM 32, a RAM 33, a nonvolatile memory 34, an operating unit 35, a display unit 36, a communication unit 37, and the like are connected to a CPU 31 via a bus.

The CPU 31 operates on the basis of an OS program, and executes programs, such as middleware and application programs. The ROM 32 stores the activation program and various fixed data. The RAM 33 is used as a work area or the like in which various kinds of data are temporarily stored when the CPU 31 executes a program.

The nonvolatile memory 34 is a memory in which stored contents are saved even when the power is switched off, and stores various settings and application programs. The application program for viewing a document associated with another document by the document association device 10 (this application program will be referred to as the viewing application) is stored in the nonvolatile memory 34.

The display unit 36 is formed with a liquid crystal display or the like. The operating unit 35 functions to receive various operations and inputs from the user. The operating unit 35 is formed with a touch panel 35a provided on the display screen of the display unit 36, a small number of hardware switches, or the like.

The communication unit 37 functions to communicate with the PC 3, the document association device 10, and other external devices through the network 2.

Figure 5:
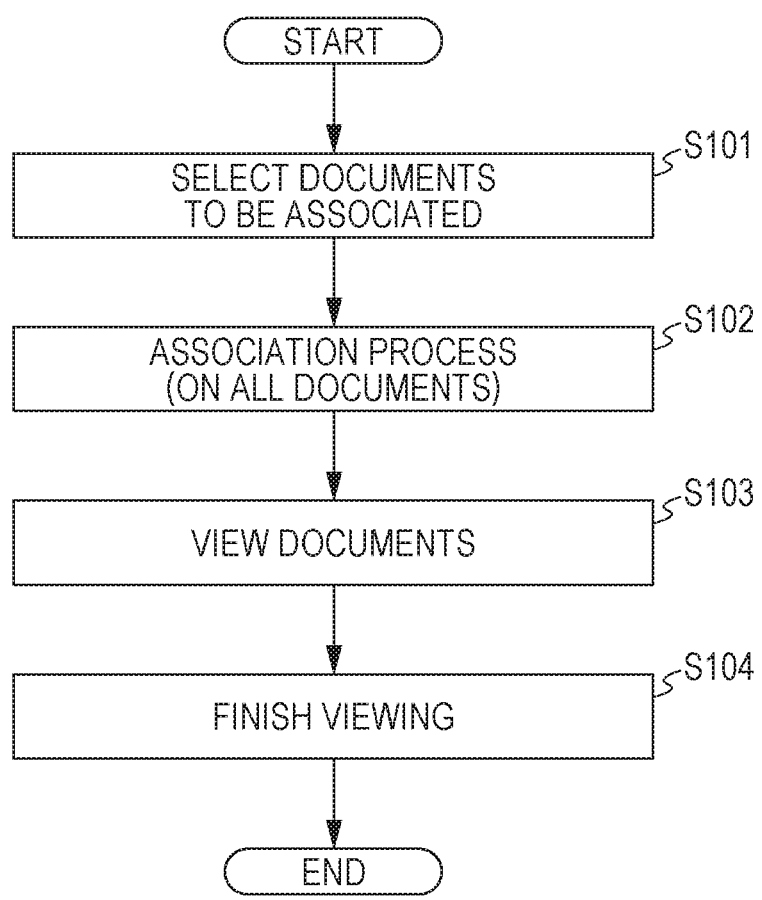
FIG. 5 is a flowchart showing an outline of an entire process of associating and viewing documents in the document viewer system.

FIG. 5 is a flowchart showing an outline of an entire process of associating and viewing documents in the document viewer system 5. The document association device 10 accepts selection of documents to be associated (step S101), and performs the association process on all the selected documents (step S102). After that the user views an associated document with the document viewer device 30 (step S103), and this process comes to an end when the user finishes the viewing (step 104). As described above, in the entire process shown in FIG. 5, the association process is performed on all the documents prior to viewing of a document.

Figure 6:
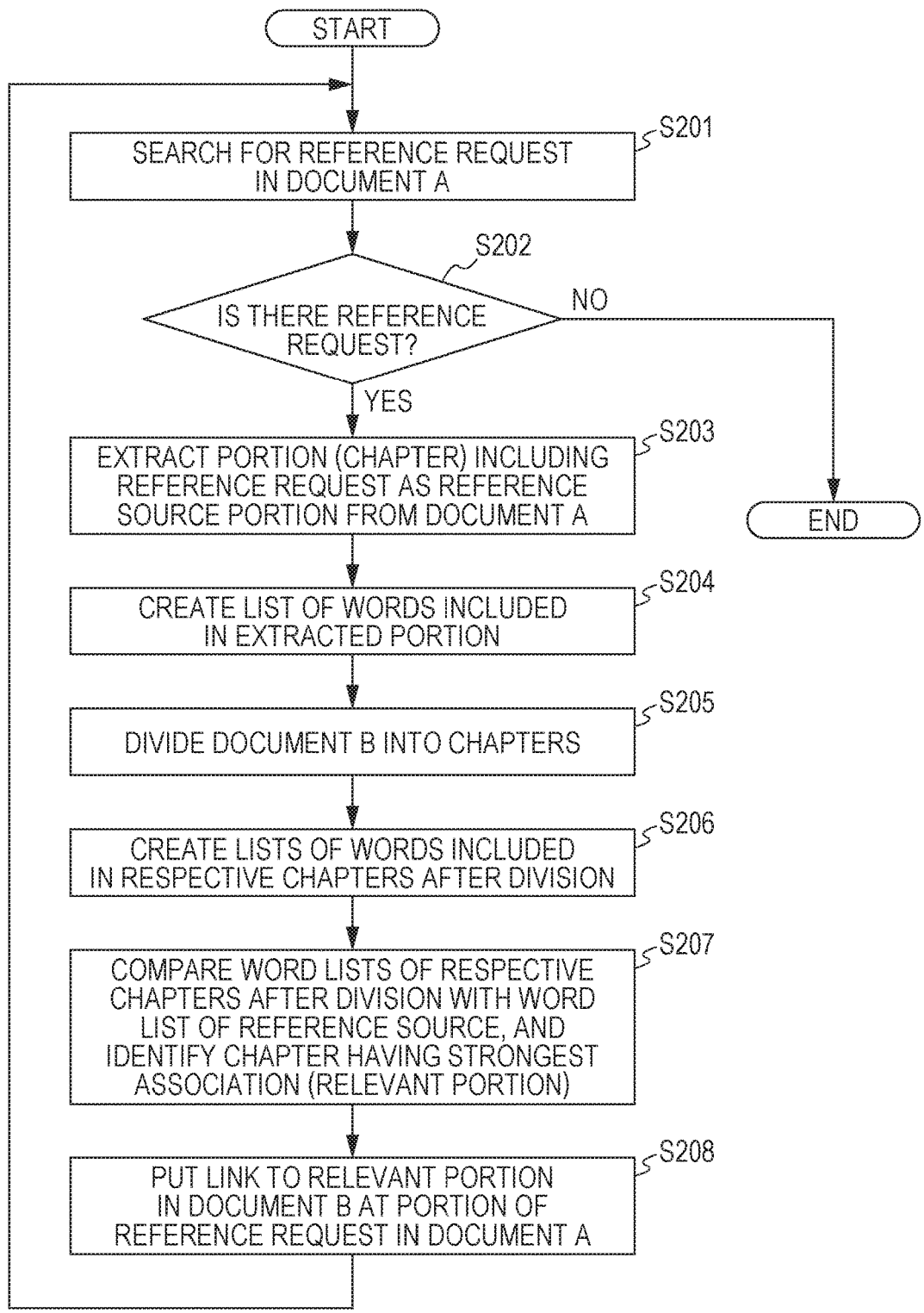
FIG. 6 is a flowchart showing the association process (step S102 in FIG. 5) in detail.
Figure 7:
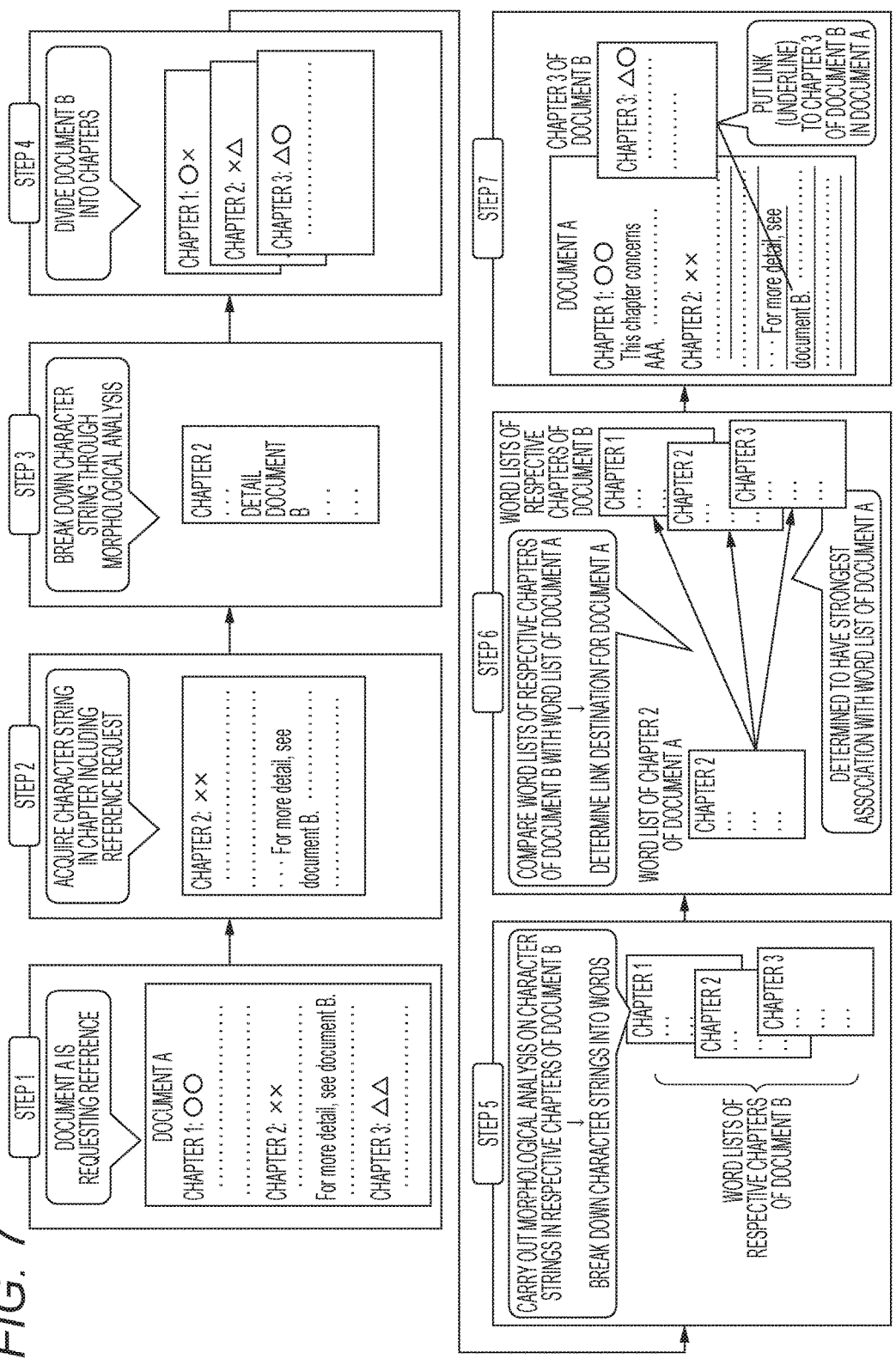
FIG. 7 is a diagram showing a specific example of the association process.

FIG. 6 shows the association process (step S102 in FIG. 5) in detail. In this example, a relevant portion in the document B is associated with a reference request in the document A. FIG. 7 shows a specific example of an association process. The document A and the document B are structured documents, and are chaptered.

The document association device 10 searches the document A for a keyword (a reference request) indicating reference to another document, such as "see document B" (step S201). In this example, the document A is sequentially searched for a reference request, starting from the top.

If a reference request is found (Yes in step S202, and step 1 in FIG. 7), a portion including the reference request is extracted as the reference source portion from the document A (step S203, and step 2 in FIG. 7). In this example, the chapter including the reference request in the chaptered document A (or a character string included, in the chapter) is extracted as the reference source portion.

Morphological analysis is then carried out on the character string in the reference source portion, to separate the character string into words (or extract the words included in the character string), and create a word list (step S204, and step 3 in FIG. 7).

The document B designated as the reference destination by the reference request is divided into portions (step S205, and step 4 in FIG. 7). In this example, the document B is divided into chapters. In a case where the document B is a document in the XML format, for example, the document structure can be determined, from tag information. In view of this, the document B is divided in accordance with the tag information. In this example, the document B is divided into chapters in accordance with tag information indicating chapters. When the reference source portion is extracted from the document A, the reference source portion may be extracted in accordance with tag information indicating chapters or the like.

For each of the chapters after the division, the document association device 10 creates a word list by extracting words from the chapter (step S206, and step 5 in FIG. 7).

The words included in the reference source portion are compared, with the words included in each of the chapters after the division of the document B, and the chapter in the document B having the largest number of times the words match is identified as the relevant portion (step S207, and step 6 in FIG. 7).

The association information (link information in this example) about the relevant portion (the chapter having the highest degree of association) in the document B is inserted and attached to the portion of the reference request in the document A (step S208, and step 7 in FIG. 7). If the document A is in the HTML (Hyper Text Markup Language) or XML format, the association information to be attached can be buried by using the tag information.

The process then returns to step S201, and the next reference request is searched for. If there is no next reference request (No in step S202), this process comes to an end.

Figure 8:
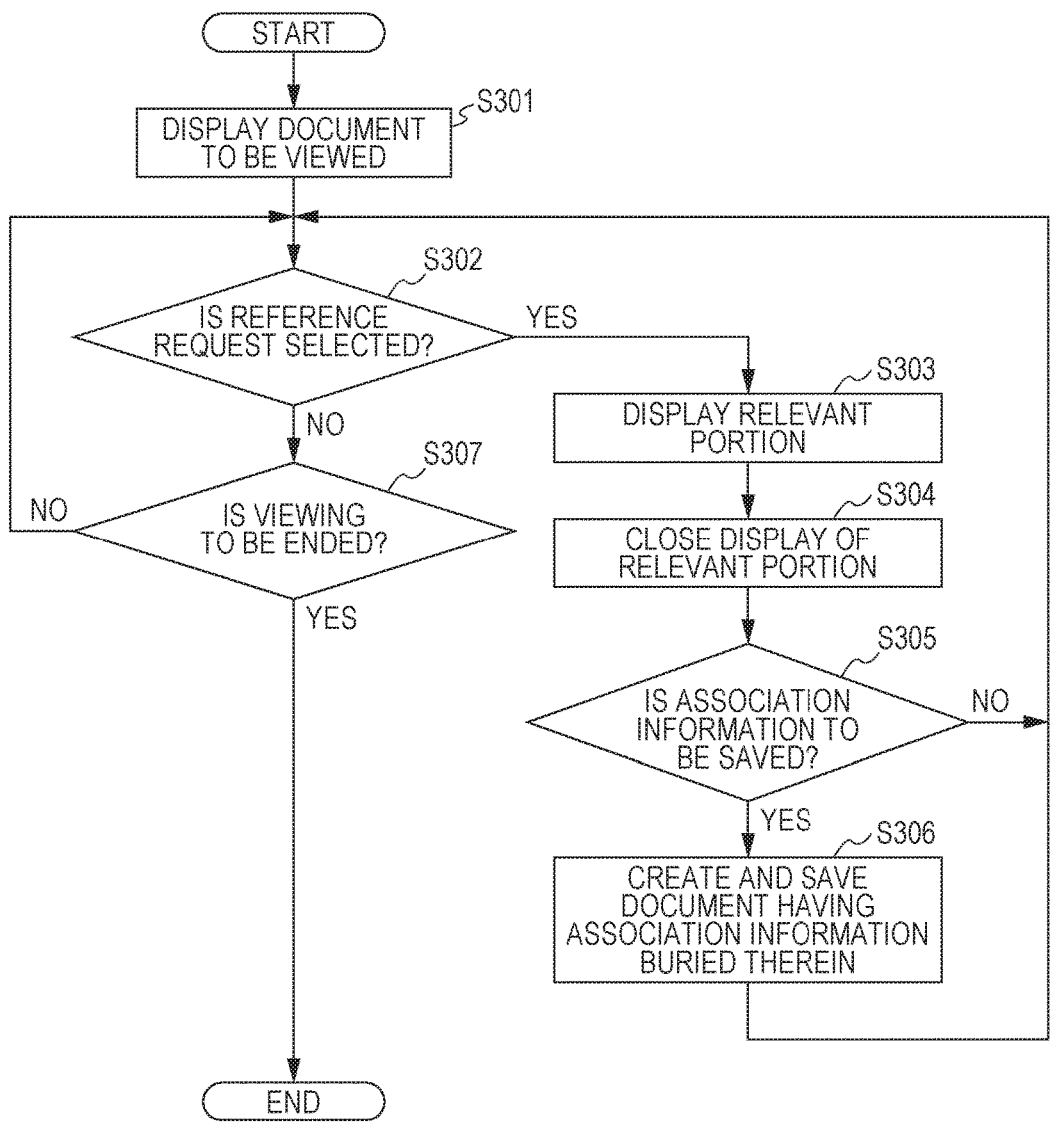
FIG. 8 is a flowchart showing the document viewing process step S103 in FIG. 5) in detail.

FIG. 8 shows the document viewing process (step S103 in FIG. 5) in detail. The document viewer device 30 displays the document A to be viewed (step S301). If the association information attached to the portion of the reference request is selected while the document A is being viewed (Yes in step S302), the relevant portion in the document B indicated by the association information is called up from the document A, and is displayed (step S303). When the display of the relevant portion is closed (step S304), the user is asked whether the association information is to be saved (step S305). If a selective response indicating that the association information is to be saved is received (Yes in step S305), a document having the association information buried therein (an associated document) is created, and is saved in a location designated by the user (step S306). The process then returns to step S302.

If a selective response indicating that the association information is not to be saved is received (No in step S305), any document having the association information buried therein is not saved, and the process returns to step S302. When a viewing ending operation is received (No in step S307), this process comes to an end.

In the process shown in FIG. 8, an inquiry as to whether the association information is to be saved is made at the time when the display of the relevant portion is closed. However, an inquiry as to whether the association information is to be saved may be made at the time when an operation to end the viewing of the document A is received, and, if a response indicating that the association information is to be saved is received, the associated document A may be saved in a location designated by the user.

Figure 9:
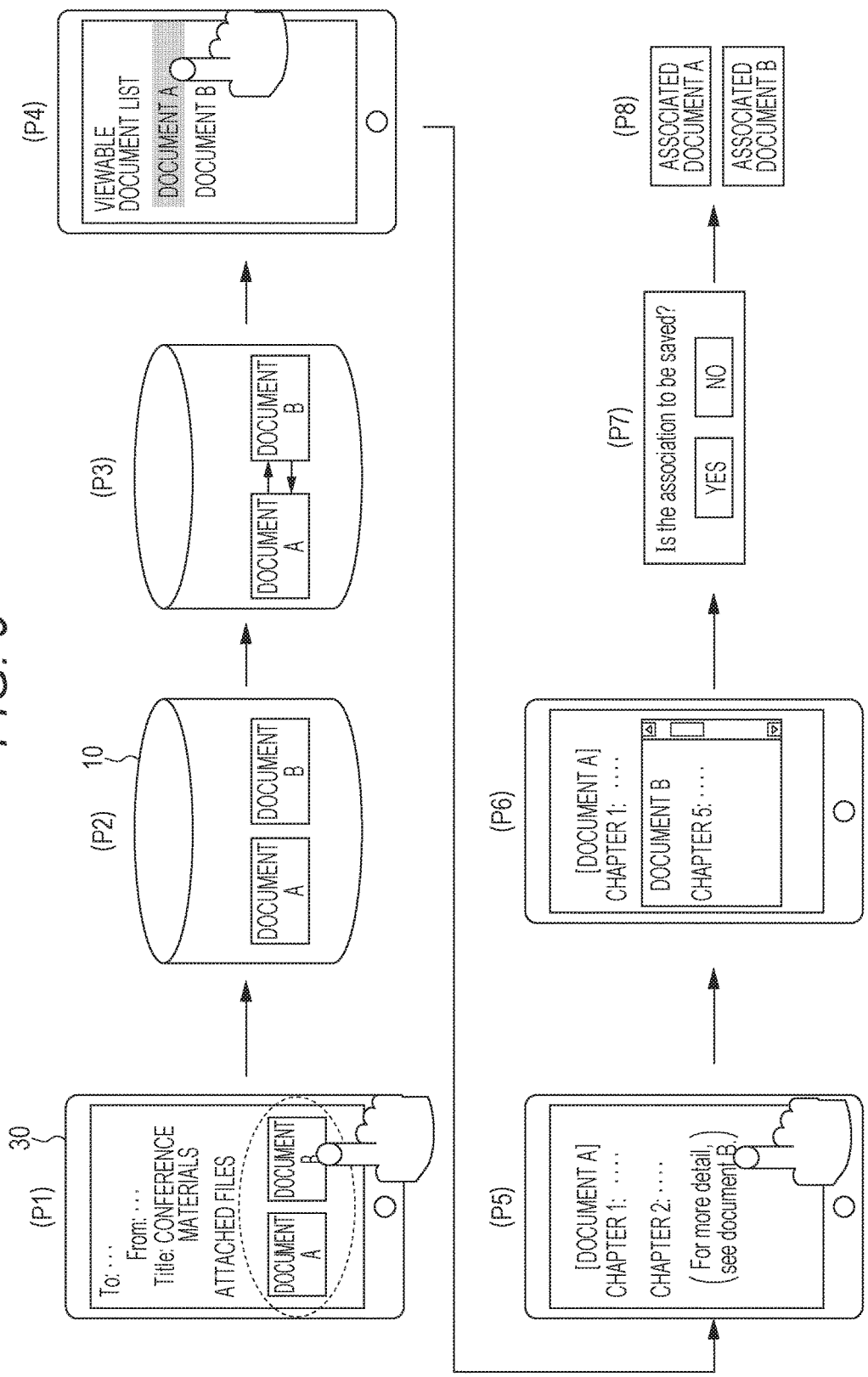
FIG. 9 is a diagram showing a specific example of a series of procedures for associating, viewing, and saving documents.

FIG. 9 shows a specific example of a series of procedures for associating, viewing, and saving documents. In this example, a received e-mail message that is a notification of a conference is to be viewed on the document viewer device 30. A document A and a document B are attached as the conference materials to this e-mail message. The user of the document viewer device 30 selects the document A and the document B as the documents to be associated (P1).

Upon receipt of the selection, the document viewer device 30 transmits and uploads the selected documents A and B to the document association device 10. The document association device 10 registers the documents A and B received from the document viewer device 30 as the documents to be associated (P2).

The document association device 10 performs an association process on each of the documents A and B (P3). Specifically, a process of associating relevant portions in the document B with respective reference requests in the document A is performed, and a process of associating relevant portions in the document A with respective reference requests in the document B is performed.

The user of the document viewer device 30 selects a document to be viewed from, among the documents registered in the document association device 10 (P4). In this example, the user of the document viewer device 30 accesses the document association device 10 from the document viewer device 30, displays a list of the documents that can be viewed, and selects a desired document to be viewed from the displayed list.

In this example, the document A is selected. If an operation to select a portion including a reference request (a portion to which association information (link information) is attached) is received from the user while the document A selected as the document to be viewed is displayed on the document viewer device 30 and is being viewed (P5), the relevant portion is called up from the document B in accordance with the link information, and is displayed on the document viewer device 30 (P6). For example, a pop-up window is displayed on the screen, and the relevant portion in the document B is displayed in the pop-up window.

When the display of the relevant portion in the document B is closed, the user of the document viewer device 30 is asked whether the association information is to be saved (P7). If an instruction to save the association information is received, the associated document A and the associated document B are saved in locations designated by the user (P8).

The buried association information is not limited to link information. Instead, the relevant information (particularly, a character string) in the document B may be buried so that the relevant portion can be called up from the reference request in the document A. For example, the relevant portion in the document B may be buried in a comments field or a remarks column that can be called up from the portion of the reference request. That is, the relevant portion in the document B is buried in a portion other than the body text of the document A so as not to affect the original contents of the document A. FIG. 10 shows an example case where the relevant portion in the document B is buried in a comments field in the document A.

Figure 11:
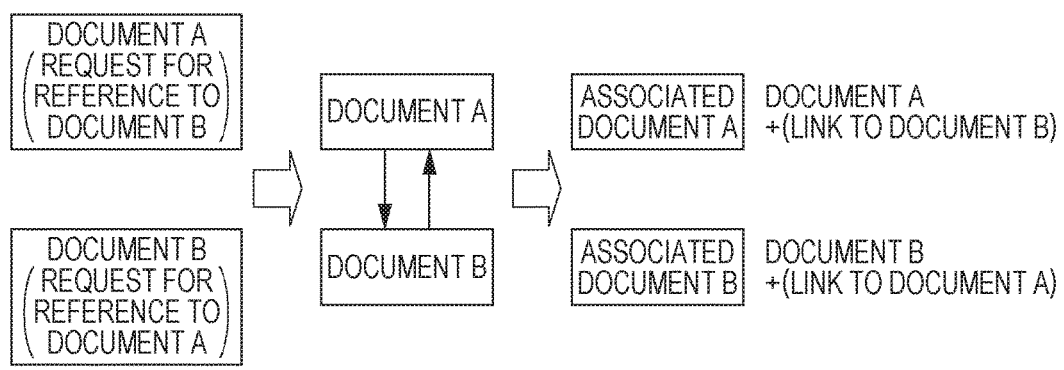
FIG. 11 is a diagram showing associated documents A and B that are generated in a case where a document A and a document B are associated with each other.

FIG. 11 shows associated documents that are generated in a case where a document A and a document B are associated with each other. The document A includes a request for reference to the document B, and the document B includes a request for reference to the document A. In this case, an associated document A is generated by burying information about a link to the document B in the document A, and an associated document B is generated by burying information about a link to the document A in the document B. The associated document A and the associated document B are then saved.

Figure 12:
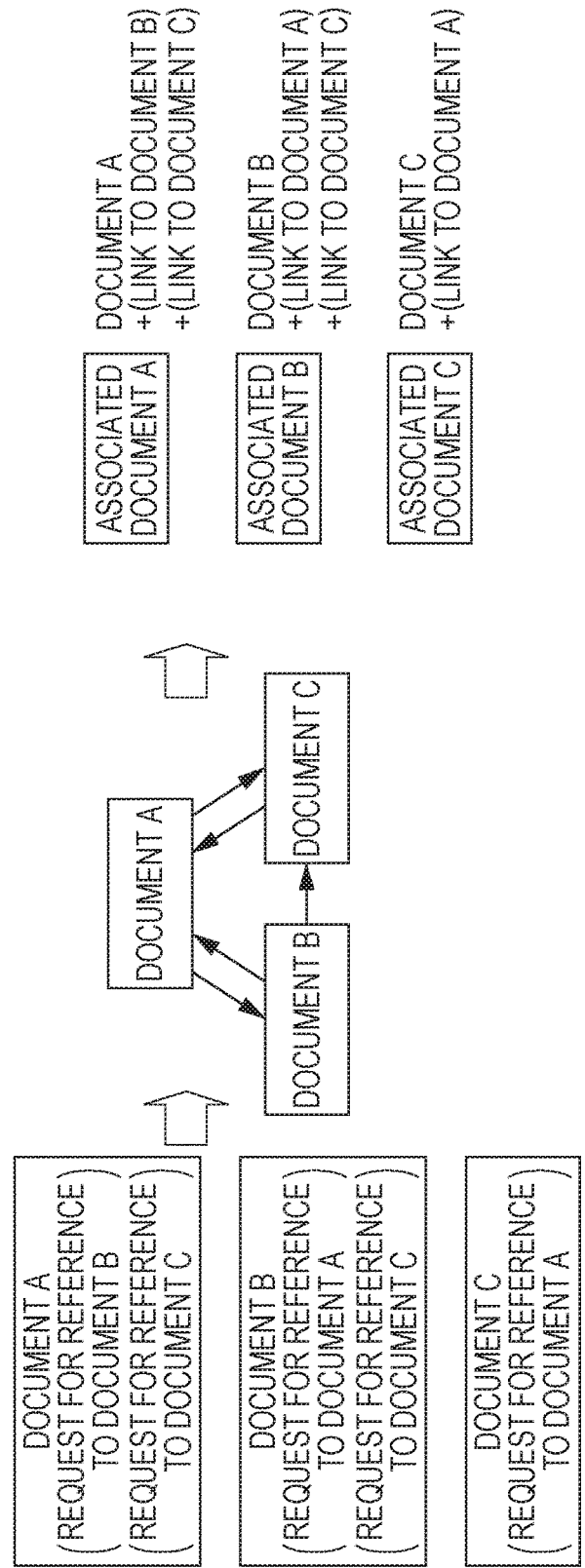
FIG. 12 is a diagram showing an example of associated documents that are generated in a case where the number of documents to be associated is three or greater.

FIG. 12 shows an example case where three or more documents are to be associated with one another. A document A includes a request for reference to a document B and a request for reference to a document C, the document B includes a request for reference to the document A and a request for reference to the document C, and the document C includes a request for reference to the document A. In this case, an associated document A is generated by burying information about a link to the document B and information about a link to the document C in the document A, an associated document B is generated by burying information about a link to the document A and information about a link to the document C in the document B, and an associated document C is generated by burying information about a link to the document A in the document C. The associated documents A, B, and C are then saved.

Figure 13:
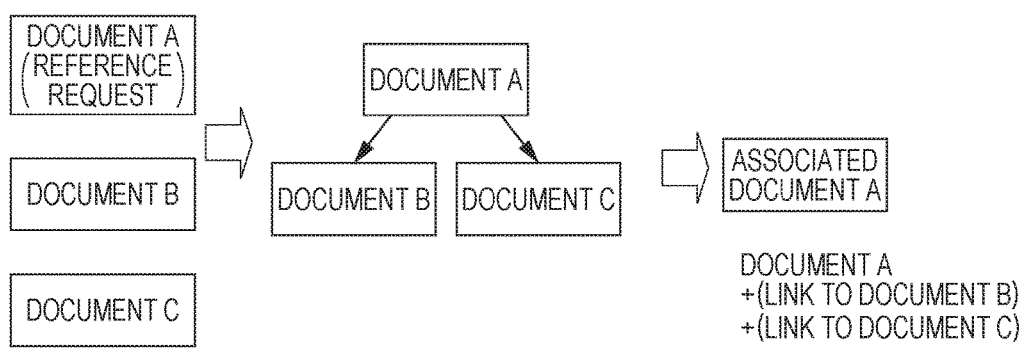
FIG. 13 is a diagram showing another example of an associated document that is generated in a case where the number of documents to be associated is three or greater.

FIG. 13 shows another example case where three or more documents are to be associated with one another. A document A includes a request for reference to another document, but which document to be referred to is not specified. In this case, a link to the portion having the highest degree of association in the document B and a link to the portion having the highest degree of association in the document C are created for the single reference request in the document A. An associated document A is created by burying information about the link to the document B and information about the link to the document C in the document A. The associated document A is then saved.

Figure 14:
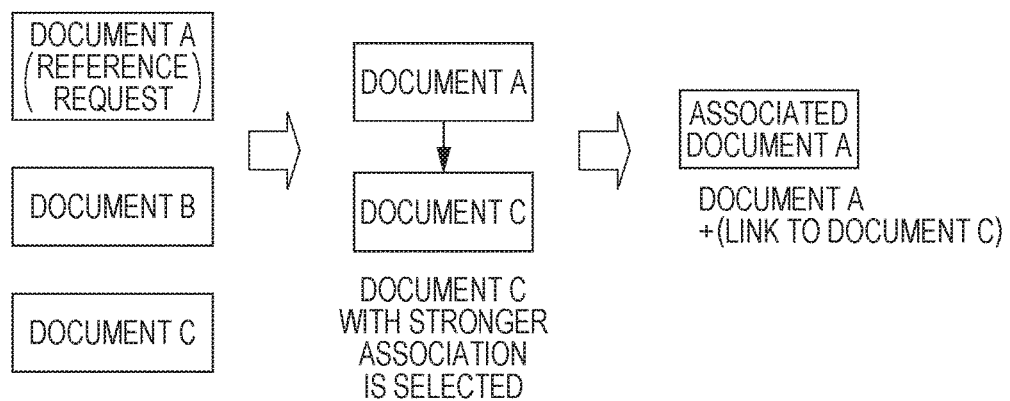
FIG. 14 is a diagram showing yet another example of an associated document that is generated in a case where the number of documents to be associated is three or greater.

FIG. 14 shows yet another example case where three or more documents are to be associated with one another. A document A includes a request for reference to another document, but which document to be referred to is not specified. In this case, a link to the portion having the highest degree of association in the document B and the document C is created for the portion of the reference request in the document A. For example, in a case where the relevant portion having the highest degree of association exists in the document C, a link to the relevant portion in the document C is created for the reference request in the document A, and an associated document A is created by burying information about the link to the document C in the document A. The associated document A is then saved.

The user can select one of the operations shown in FIGS. 13 and 14.

Next, a second embodiment of the present invention is described.

The respective structures of a document viewer system 5, a document association device 10, and a document viewer device 30 are the same as those of the first embodiment.

Figure 15:
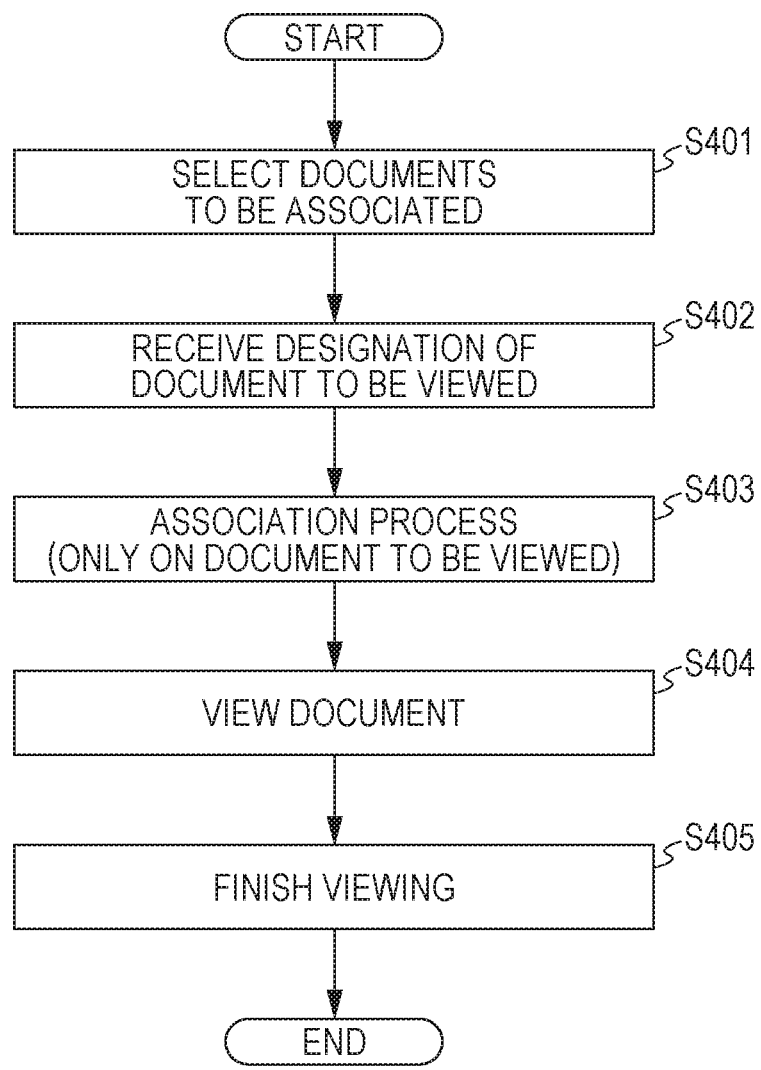
FIG. 15 is a flowchart showing an outline of an entire process of associating and viewing documents in a second embodiment.

FIG. 15 is a flowchart showing an outline of an entire process of associating and viewing documents in the second embodiment. First, selection of documents to be associated is received (step S401). Selection of a document to be viewed among the documents selected as the documents to be associated is received (step S402). After the selection of a document to be viewed is received, an association process is performed only on the document to be viewed (step S403), and viewing of the document is started (step S404). When the viewing is ended (step S405), this process comes to an end.

As described above, in the process shown in FIG. 15, a document to be viewed is designated, and an association process is performed only on the designated document. Step 5403 is the same as step S102 in FIG. 5, and is specifically shown in FIG. 6. Step S404 is the same as step S103 in FIG. 5, and is specifically shown in FIG. 8.

Figure 16:
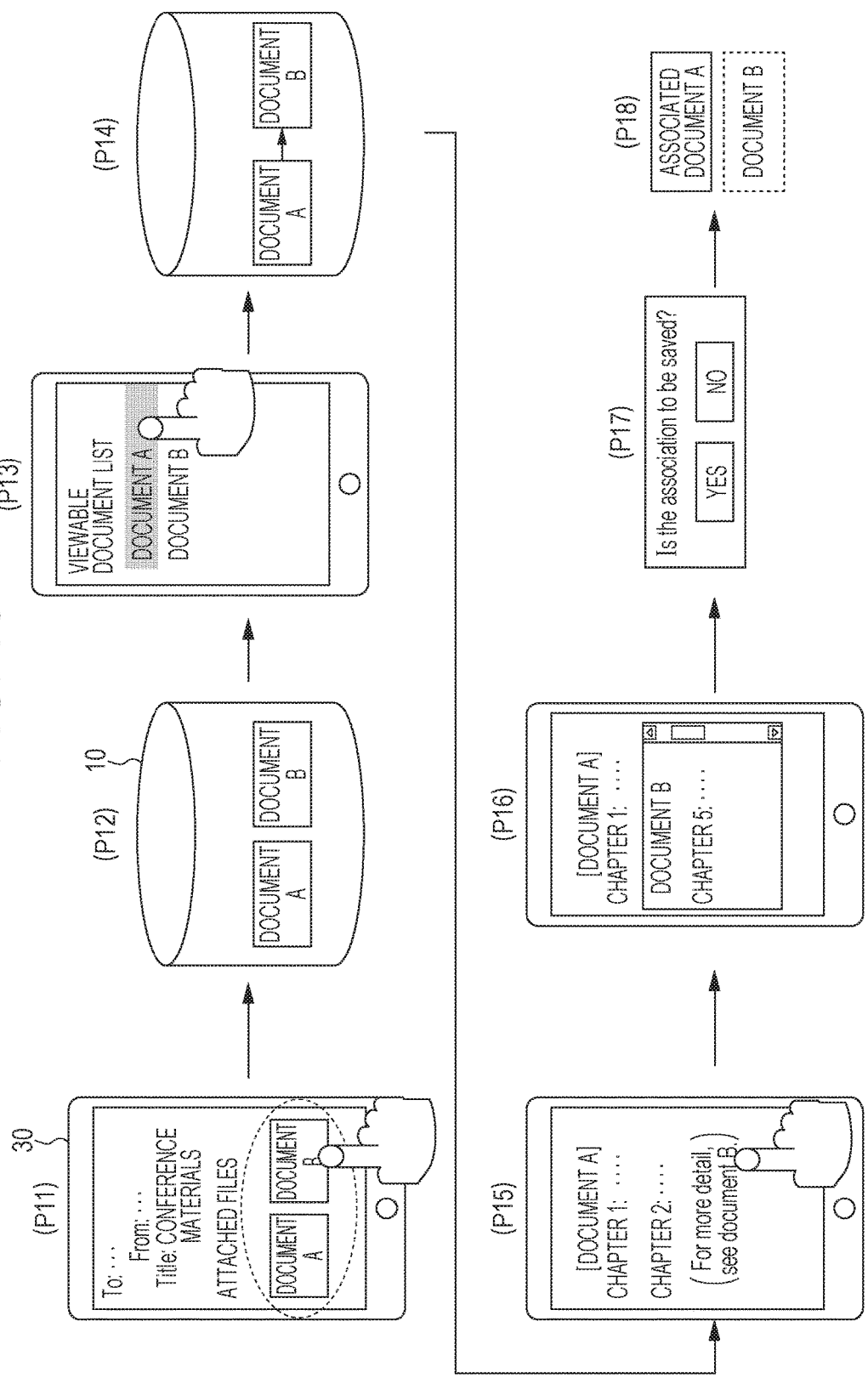
FIG. 16 is a diagram showing a specific example of a series of procedures for viewing, associating, and saving documents in the second embodiment.

FIG. 16 shows a specific example of a series of procedures for associating, viewing, and saving a document. In this example, a received e-mail message that is a notification of a conference is to be viewed on the document viewer device 30. A document A and a document B are attached as the conference materials to this e-mail message. The user of the document viewer device 30 selects the document A and the document B as the documents to be associated (P11).

The document viewer device 30 transmits and uploads the selected documents A and B to the document association device 10. The document association device 10 registers the documents A and B received from the document viewer device 30 as the documents to be associated (P12).

The user of the document viewer device 30 then selects a document to be viewed from among the documents registered in the document association device 10 (P13). In this example, the user of the document viewer device 30 accesses the document association device 10 from the document viewer device 30, displays a list of the documents that can be viewed, and selects a desired document to be viewed from the displayed list.

In this example, the document A is selected. The document association device 10 performs an association process on the document A selected as the document to be viewed (P14). Specifically, a process of associating relevant portions in the document B with respective reference requests in the document A is performed. Any association process is not performed on the document B.

If an operation to select a portion including a reference request (a portion to which link information is attached) is received from the user while the document A subjected to the association process is displayed on the document viewer device 30 and is being viewed (P15), the relevant portion is called up from the document B in accordance with the link information, and is displayed on the document viewer device 30 (P16). For example, a pop-up window is displayed on the screen, and the relevant portion in the document B is displayed in the pop-up window.

When the display of the relevant portion in the document B is closed, an inquiry as to whether the association information is to be saved is made (P17). If an instruction to save the association information is received, the associated document A is saved in a location designated by the user (P18). At this point, the document B as the reference destination may also be saved.

In the second embodiment, when a document to be viewed is designated, a process of associating the document to be viewed with the reference destination is performed. If an association process is performed to associate all the documents with one another as in the first embodiment, the association process might unnecessarily be performed even on a document that is not to be viewed by the user. In the second embodiment, however, such unnecessary processing is not performed.

In the first embodiment, all the documents are associated with one another before a viewing instruction is received. Accordingly, the waiting time from the reception of a viewing instruction till the start of viewing can be made shorter than that in a case where an association process is performed after the start of viewing. In the second embodiment, an association process may be performed in the background of document viewing, to shorten the waiting time.

Figure 17:
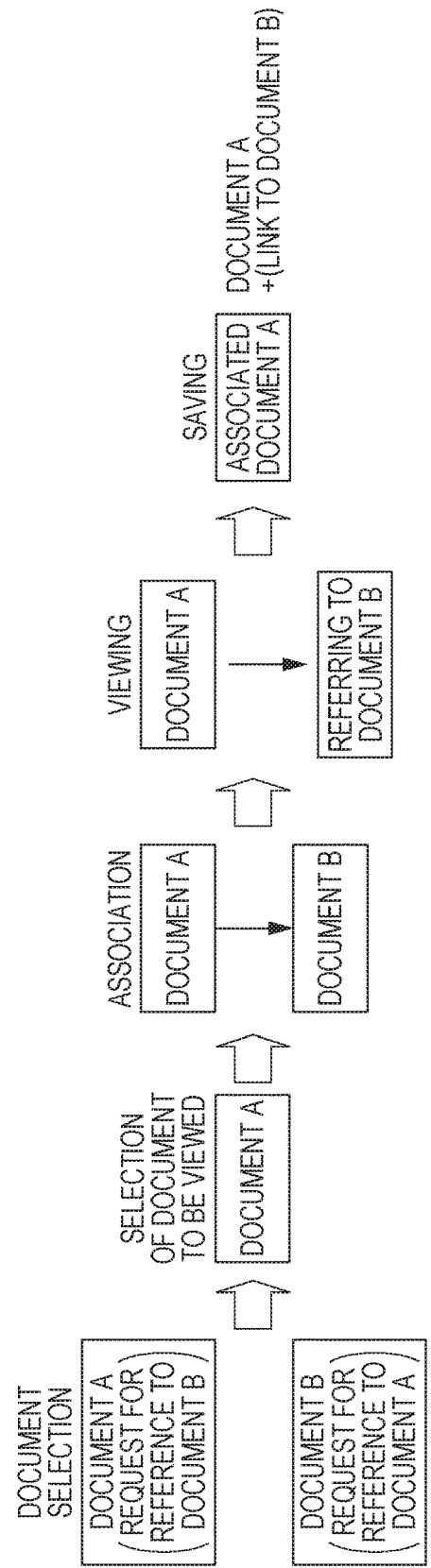
FIG. 17 is a diagram showing a process of generating and saving an associated document in a case where a document A is viewed in the second embodiment.
Figure 19A:
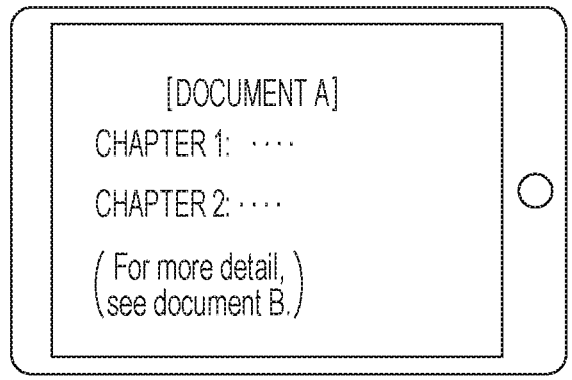
FIGS. 19A to 19C are diagrams showing an example of a conventional operation to refer to a document from a reference source document.
Figure 19B:
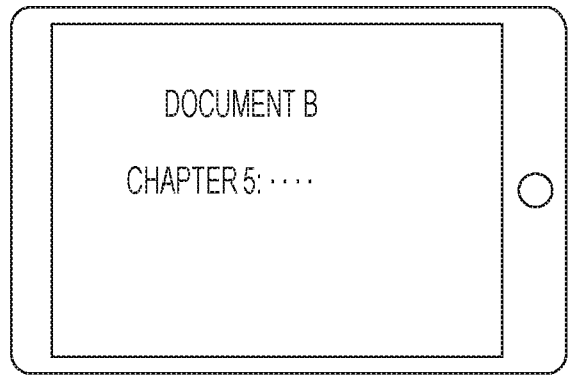
Figure 19C:
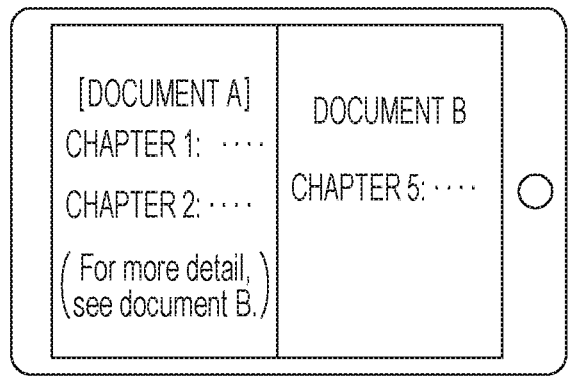

FIG. 17 shows an associated document that is generated in a case where a document A is viewed in the second embodiment. The document A includes a request for reference to the document B, and the document B includes a request for reference to the document A. As the document A is selected as the document to be viewed, the document B is associated with the document A. When the link information buried in the reference request is selected at the time of the viewing, the relevant portion in the document B is called up and displayed. If an instruction to save the association information is received after the viewing of the document A is ended, an associated document A having the information about the link to the document B buried in the document A is saved.

Next, a third embodiment of the present invention is described.

In the first and second embodiments, the document viewer device 30 and the document association device 10 are provided independently of each other in the document viewer system 5. In the third embodiment, however, the document viewer device 30 also has the functions of the document association device 10. That is, the viewing application of the document viewer device 30 performs a document association process. The contents of the process are the same as those in the first and second embodiments, and therefore, explanation of them is not made herein.

FIG. 18 shows a specific example of a series of procedures for associating, viewing, and saving documents in the document viewer device 30 of the third embodiment. In this example, a received e-mail message that is a notification of a conference is to be viewed on the document viewer device 30. A document A and a document B are attached as the conference materials to this e-mail message. The user of the document viewer device 30 selects the document A and the document B as the documents to be associated (P21).

Upon receipt of the selection, the document viewer device 30 performs an association process on each of the documents A and B (P22). Specifically, a process of associating relevant portions in the document B with respective reference requests in the document A is performed, and a process of associating relevant portions in the document A with respective reference requests in the document B is performed.

The user selects a document to be viewed from among the documents registered in the document viewer device 30 (P23). In this example, the document A is selected. If an operation to select a portion including a reference request (a portion to which link information is attached) is received from the user while the document A selected as the document to be viewed is displayed on the document viewer device 30 (P24), the relevant portion is called up from the document B in accordance with the link information, and is displayed on the document viewer device 30 (P25). For example, a pop-up window is displayed on the screen, and the relevant portion in the document B is displayed in the pop-up window.

When the display of the relevant portion in the document B is closed, an inquiry as to whether the association information is to be saved is made (P26). If an instruction to save the association information is received, the associated document A and the associated document B are saved in locations designated by the user (P27).

Although embodiments of the present invention have been described so far with reference to the accompanying drawings, specific structures are not limited to those embodiments, and modifications and additions within the scope of the invention are included in the present invention.

An associated document may be overwritten on the original document, or may be saved as a different document in a different location. For example, in a case where an associated document A and an associated document B are to be saved in different locations from the original documents A and B, the link information to be buried in the associated document A is rewritten during the saving process, to indicate the new location in which the associated document B is to be saved. Likewise, the link information to be buried in the associated document B is rewritten during the saving process, to indicate the new location in which the associated document A is to be saved.

In the above embodiments, the words included in the respective chapters after the document to be referred to is divided are compared with the words included in the reference source portion, and the chapter with the largest number of times the words match is identified as the relevant portion having the highest degree of association. However, the method of measuring a degree of association is not limited to that. For example, a degree of association may be measured by carrying out semantic analysis on paragraphs.

A relevant portion (a character string) is not necessarily buried in a comments field or a remarks column in the reference source document A relevant portion may be buried in the header portion of the reference source document, if the relevant portion can be called up later without affecting the original contents of the reference source document. For example, the relevant portion is buried in the header portion, and information about a link to the relevant portion in the header portion is also attached to the reference source portion. With this arrangement, when the link information is selected while the body text is being viewed, the relevant portion in the header portion is called up and displayed.

Although the reference source portion is extracted and the document to be referred to is divided on a chapter basis in the above embodiments, the unit of extraction and division is not limited to that. For example, the unit of extraction and division may be one or more paragraphs.

As for the keyword(s) for determining a reference request, one or more keywords may be set in advance.

In a case where the portion (chapter) to be referred to is designated by a reference request, such as "chapter 5 in document B", chapter 5 in the document B should be identified as the relevant portion.

Although the present invention has been described and illustrated in detail, at is clearly understood that the same is by way of illustrated and example only and is not to be taken by way of limitation, the scope of the present invention being interpreted by terms of the appended claims.

What is claimed is:

1. A document association device comprising:
    a memory; and
    a processor configured to connect to the memory and to perform operations comprising:
    receiving designation of a first document and a second document to be referred to from the first document;
    searching the first document for a predetermined keyword indicating a reference to the second document;
    extracting, as a predetermined portion of the first document, a portion of the first document that includes the predetermined keyword;
    dividing the second document into a plurality of portions;
    after the predetermined portion of the first document has been extracted, automatically comparing contents of the respective portions of the divided second document with contents of the predetermined portion of the first document;
    automatically identifying, as a relevant portion of the second document, a portion having a highest degree of association with the predetermined portion of the first document, from among the plurality of portions of the second document;
    associating the relevant portion of the second document with the predetermined portion of the first document; and
    burying, in the predetermined portion of the first document, association information for enabling calling up of the relevant portion of the second document from the predetermined portion of the first document, to generate a document having the buried association information, and saving the document.

2. The document association device according to claim 1, wherein:
    the processor is configured to perform further operations comprising presenting a user with the relevant portion of the second document associated with the predetermined portion of the first document, and receiving a selective response indicating whether to save the document having the association information buried in the first document, and the saving of the document is performed in response to receiving a selective response indicating that the document is to be saved.

3. The document association device according to claim 1, wherein the processor buries link information in the predetermined portion of the first document, the link information being for calling up the relevant portion of the second document.

4. The document association device according to claim 1, wherein the processor extracts the relevant portion from the second document, and buries the extracted relevant portion in the first document, to enable calling up and display of the relevant portion from the predetermined portion of the first document, without affecting original contents of the first document.

5. The document association device according to claim 1, wherein the processor receives designation of a saving location of the document having the association information buried in the first document from a user, and saves the document including the buried association information in the designated saving location.

6. The document association device according to claim 1, wherein the processor performs the dividing of the second document in accordance with tag information defining a document structure.

7. A document viewer system comprising:
the document association device according to claim 1; and
a viewer device configured to allow a user to view a document, the viewer device including a display,
wherein, in response to receiving a predetermined operation on the predetermined portion while the first document associated by the processor is being viewed, the viewer device calls up and displays the relevant portion.

8. A non-transitory recording medium storing a computer readable program which, when executed by a computer, causes the computer to perform operations comprising:
receiving designation of a first document and a second document to be referred to from the first document;
searching the first document for a predetermined keyword indicating a reference to the second document;
extracting, as a predetermined portion of the first document, a portion of the first document that includes the predetermined keyword;
dividing the second document into a plurality of portions;
after the predetermined portion of the first document has been extracted, automatically comparing contents of the respective portions of the divided second document with contents of the predetermined portion of the first document;
automatically identifying, as a relevant portion of the second document, a portion having a highest degree of association with the predetermined portion of the first document, from among the plurality of portions of the second document;
associating the relevant portion of the second document with the predetermined portion of the first document; and
burying, in the predetermined portion of the first document, association information for enabling calling up of the relevant portion of the second document from the predetermined portion of the first document, to generate a document having the buried association information, and saving the document.

* * * * *